United States Patent
Nakano et al.

(10) Patent No.: US 10,397,769 B2
(45) Date of Patent: Aug. 27, 2019

(54) COMMUNICATION SYSTEM MANAGEMENT METHOD AND COMMUNICATION SYSTEM MANAGEMENT DEVICE

(71) Applicant: ICOM INCORPORATED, Osaka-shi, Osaka (JP)

(72) Inventors: Akira Nakano, Osaka (JP); Yuma Oda, Osaka (JP)

(73) Assignee: ICOM INCORPORATED, Osaka-shi, Osaka (JP)

( * ) Notice: Subject to any disclaimer, the term of this patent is extended or adjusted under 35 U.S.C. 154(b) by 0 days.

(21) Appl. No.: 15/762,322

(22) PCT Filed: Nov. 18, 2016

(86) PCT No.: PCT/JP2016/084203
§ 371 (c)(1),
(2) Date: Mar. 22, 2018

(87) PCT Pub. No.: WO2017/086417
PCT Pub. Date: May 26, 2017

(65) Prior Publication Data
US 2018/0279114 A1    Sep. 27, 2018

(30) Foreign Application Priority Data
Nov. 18, 2015    (JP) .................................. 2015-225985

(51) Int. Cl.
*H04W 4/00*    (2018.01)
*H04W 8/08*    (2009.01)
(Continued)

(52) U.S. Cl.
CPC ........... *H04W 8/08* (2013.01); *H04L 41/0806* (2013.01); *H04L 67/34* (2013.01);
(Continued)

(58) Field of Classification Search
CPC ....... H04W 8/18; H04W 8/183; H04W 36/04; H04W 36/18; H04W 36/30; H04W 36/32; H04W 48/18; H04W 60/00; H04W 92/02
(Continued)

(56) References Cited

U.S. PATENT DOCUMENTS

| | | | | |
|---|---|---|---|---|
| 5,924,041 A | * | 7/1999 | Alperovich | ........... H04W 84/08 455/433 |
| 2004/0132467 A1 | * | 7/2004 | Hull | ........................ H04W 4/02 455/458 |

(Continued)

FOREIGN PATENT DOCUMENTS

| | | |
|---|---|---|
| EP | 1244321 A1 | 9/2002 |
| JP | H09-18582 A | 1/1997 |

(Continued)

OTHER PUBLICATIONS

"IP Transceiver System IP-500H" by Icom Incorporated [online], <URL: https://www.icom.co.jp/products/land_mobile/products/ip_transceiver/IP500H/index.html>, retrieved on Mar. 7, 2018, which is discussed on p. 1-2 of the specification.

(Continued)

*Primary Examiner* — Anthony S Addy
*Assistant Examiner* — Matthew W Genack
(74) *Attorney, Agent, or Firm* — Muncy, Geissler, Olds & Lowe, P.C.

(57) ABSTRACT

[Problem] To conduct a process of moving a designated communication terminal belonging to a first communication system so as to belong to a second communication system without errors.

[Solution] A management device is provided, which deletes information on a communication terminal of a first configuration device and then adds information of the communication terminal to the second configuration device. The man- (Continued)

agement device is provided with an interface unit and a control unit. The interface unit obtains a first configuration file which stores a configuration data on a communication terminal belonging to a first communication system, and a second configuration file which stores a configuration data on a communication terminal belonging to a second communication system. The control unit deletes a configuration data of a designated communication terminal from the obtained first configuration file, and adds a configuration data of the designated communication terminal to the obtained second configuration file.

3 Claims, 11 Drawing Sheets

(51) Int. Cl.
  *H04W 64/00*   (2009.01)
  *H04L 29/08*   (2006.01)
  *H04M 3/42*   (2006.01)
  *H04L 12/24*   (2006.01)
  *H04W 60/04*   (2009.01)
  *H04W 8/06*   (2009.01)

(52) U.S. Cl.
  CPC ..... *H04M 3/42144* (2013.01); *H04W 64/006* (2013.01); *H04W 8/06* (2013.01); *H04W 60/04* (2013.01)

(58) Field of Classification Search
  USPC .... 455/432.1–432.3, 435.1–435.3, 436–444; 370/331–332
  See application file for complete search history.

(56) References Cited

U.S. PATENT DOCUMENTS

2009/0305674 A1   12/2009   Teittinen et al.
2014/0349641 A1*  11/2014  Jiang ..................... H04W 4/02
                           455/432.3

FOREIGN PATENT DOCUMENTS

JP    2007-295465 A   11/2007
WO   2015/133021 A1   9/2015
WO   2017/006833 A1   1/2017

OTHER PUBLICATIONS

International Search Report of PCT/JP2016/084203.
The extended European search report of the corresponding EP application No. 16866417.5 dated Apr. 12, 2019.

* cited by examiner

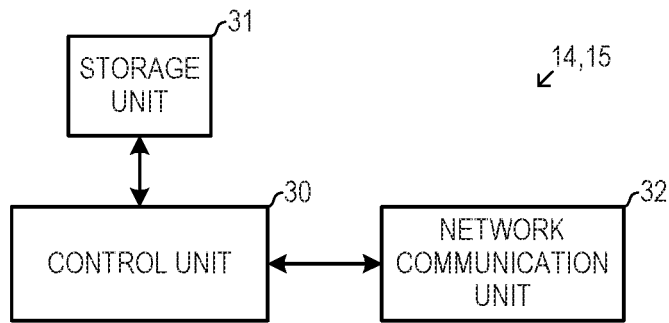

Fig. 6

| REMOTE CONFIGURATION DEVICE 1 TERMINAL IDENTIFICATION INFORMATION (ICCID) | PROVISIONING SERVER ADDRESS |
| --- | --- |
| | CALL CONTROLLER 1 ADDRESS |
| REMOTE CONFIGURATION DEVICE 2 TERMINAL IDENTIFICATION INFORMATION (ICCID) | PROVISIONING SERVER ADDRESS |
| | CALL CONTROLLER 2 ADDRESS |
| REMOTE CONFIGURATION DEVICE 3 TERMINAL IDENTIFICATION INFORMATION (ICCID) | COMMUNICATION TERMINAL LIST |

Fig. 7A

| | |
|---|---|
| COMMUNICATION TERMINAL 1<br>TERMINAL IDENTIFICATION INFORMATION (ICCID) | |
| COMMUNICATION TERMINAL 2<br>TERMINAL IDENTIFICATION INFORMATION (ICCID) | |
| COMMUNICATION TERMINAL 3<br>TERMINAL IDENTIFICATION INFORMATION (ICCID) | PROVISIONING SERVER ADDRESS |
| COMMUNICATION TERMINAL 4<br>TERMINAL IDENTIFICATION INFORMATION (ICCID) | |
| COMMUNICATION TERMINAL 5<br>TERMINAL IDENTIFICATION INFORMATION (ICCID) | |

Fig. 7B

| | | |
|---|---|---|
| COMMUNICATION TERMINAL 1<br>TERMINAL IDENTIFICATION INFORMATION (ICCID) | BASE1 | |
| COMMUNICATION TERMINAL 2<br>TERMINAL IDENTIFICATION INFORMATION (ICCID) | BASE1 | |
| COMMUNICATION TERMINAL 3<br>TERMINAL IDENTIFICATION INFORMATION (ICCID) | BASE1 | |
| COMMUNICATION TERMINAL 4<br>TERMINAL IDENTIFICATION INFORMATION (ICCID) | BASE2 | |
| COMMUNICATION TERMINAL 5<br>TERMINAL IDENTIFICATION INFORMATION (ICCID) | BASE2 | |
| COMMUNICATION TERMINAL 6<br>TERMINAL IDENTIFICATION INFORMATION (ICCID) | NON-BELONGING | INDIVIDUAL DATA |

Fig. 8

| COMMUNICATION TERMINAL 1<br>TERMINAL IDENTIFICATION INFORMATION (ICCID) | ACTIVE FLAG |
|---|---|
| COMMUNICATION TERMINAL 2<br>TERMINAL IDENTIFICATION INFORMATION (ICCID) | ACTIVE FLAG |
| COMMUNICATION TERMINAL 3<br>TERMINAL IDENTIFICATION INFORMATION (ICCID) | ACTIVE FLAG |

Fig. 10A

| COMMUNICATION TERMINAL 4<br>TERMINAL IDENTIFICATION INFORMATION (ICCID) | ACTIVE FLAG |
|---|---|
| COMMUNICATION TERMINAL 5<br>TERMINAL IDENTIFICATION INFORMATION (ICCID) | ACTIVE FLAG |

Fig. 10B

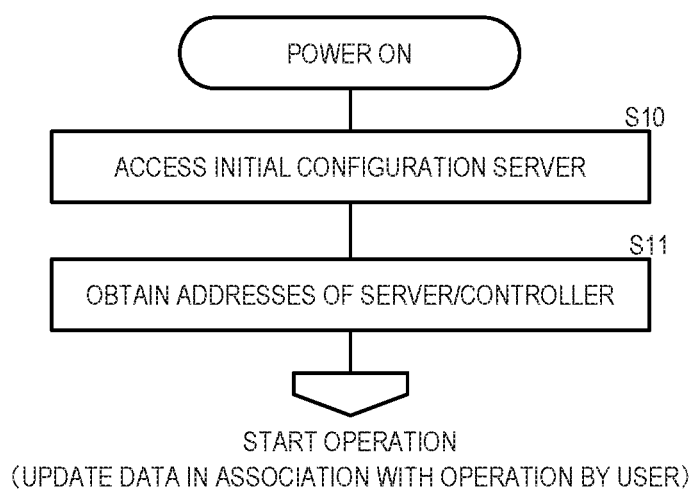

Fig. 11

COMMUNICATION SYSTEM MANAGEMENT METHOD AND COMMUNICATION SYSTEM MANAGEMENT DEVICE

TECHNICAL FIELD

The present invention relates to a communication system management method and a communication system management device which enable a user to manage the communication system while system stability is maintained.

A voice communication system having a server (a call controller) installed on a network and conducting a voice communication via the server is put into practice (Non-Patent Literature 1, for example). In such voice communication system, a second server (provisioning server) is installed on the network in order to set provisioning data (configuration data) in a communication terminal for defining an operation of the communication terminal having a shape of a transceiver. When the communication terminal is powered on, the communication terminal is connected to the network and makes an access to the provisioning server, downloads configuration data (provisioning data) from the provisioning server and stores it in a memory (provisioning processing). By this provisioning processing, the communication terminal is capable of an operation of PTT communication via the call controller.

In the voice communication system, a plurality of the communication terminals are possessed by a user of the system (a business enterprise using a communication service, for example), but the call controller and the provisioning server are managed by a provider of the system (a provider of the communication service, for example). Individual provisioning data is set in each of the communication terminals. A part of or the whole of the configuration of the communication terminals may also need to be change during an operation of the voice communication system.

Conventionally, an access path to the server and an authority to update the configuration data have not been provided or given to the system user in order to maintain security of the voice communication system. That is, the system user could not update the configuration data of the user-owned communication terminal by accessing the server. Thus, the system provider has written the configuration data of all the communication terminals of the system users in the provisioning server. The writing of the configuration data in the provisioning server was also needed at a change of the operation in addition to start of the operation of the voice communication system.

CITATION LIST

Non-Patent Literature

[Non-Patent Literature 1] "IP transceiver system IP-500H" by Icom Incorporated [online], [searched on Nov. 4, 2015], Internet <URL: https://www.icom.co.jp/products/land_mobile/products/ip_transceiver/IP500H/index.html>

Problems to be Solved by Invention

In the aforementioned operation form, the workload of the provider of the system is large, the operation management cost for the system may be increased, and the user convenience is not sufficient. Thus, it is considered that an update of the configuration data is opened to the user (client).

When a scale of the communication system is increased, the communication system may be operated by a plurality of divided systems (call controllers). In this case, the configuration data need to be changed when the communication terminal is transferred among the divided systems. In this operation, an information of the communication terminal is deleted from one divided system, and the information of the communication terminal is added to the other divided system.

In the aforementioned operation, the deletion of the information from the one divided system and the addition of the information to the other divided system are need to be operated in series. If the in-series-operation is failed, the communication terminal comes not to be connected to the controller. In particular, when the user of the system conducts this operation, it is considered that the failure of the in-series-operation occurs higher possibility.

The object of the present invention is to provide the communication system management method and the communication system management device for conducting the movement of the communication terminal among a plurality of the divided systems without failure.

SUMMARY OF INVENTION

A communication system management method according to the present invention transfers, in a communication system including a first configuration device for storing configuration data of communication terminals belonging to a first communication system and a second configuration device for storing configuration data of communication terminals belonging to a second communication terminal, a predetermined communication terminal belonging to the first communication system to the second communication system. A management device is also provided, and this management device adds an information of the predetermined communication terminal to the second configuration device after deleting the information of the predetermined communication device of the first configuration device.

A communication system management device according to the present invention is provided with an communicating unit and a control unit. The communicating unit obtains a configuration file from the first configuration device including a first configuration file stored the configuration data of the communication terminal belonging to the first communication system and the second configuration device including the second configuration file stored a configuration data of the communication terminal belonging to the second communication system, and returns updated files to the first configuration device and the second configuration device. The control unit deletes the configuration data of the predetermined communication terminal from the obtained first configuration file, and adds the configuration data of the predetermined communication terminal to the obtained second configuration file.

In the present invention, the management device was provided in addition to the first and second configuration device. The management device deletes the predetermined communication terminal (the configuration data of the predetermined communication terminal) from the first communication system, and adds the predetermined communication terminal to the second communication system. In this way, as the deletion and the addition of the communication terminal are collectively conducted in the management device, and not conducted independently at the first configuration device or at the second configuration device, failure of the cooperation hardly occurs.

Advantageous Effect of Invention

According to the present invention, the communication terminals can move among a plurality of the communication systems without failure.

BRIEF DESCRIPTION OF DRAWINGS

FIG. 6 is a block diagram of a server of the voice communication system.

FIG. 7A is a diagram illustrating an initial configuration table provided in an initial configuration server.

FIG. 7B is a diagram illustrating an initial configuration table provided in the communication terminal.

FIG. 8 is a diagram illustrating a terminal management table provided in the remote configuration device for management.

FIG. 10A is a diagram illustrating a registration table provided in a call control server.

FIG. 10B is a diagram illustrating a registration table provided in the call control server.

FIG. 11 is a flowchart illustrating an operation at startup of the remote configuration device.

DETAILED DESCRIPTION OF THE EMBODIMENT

Figure 1:
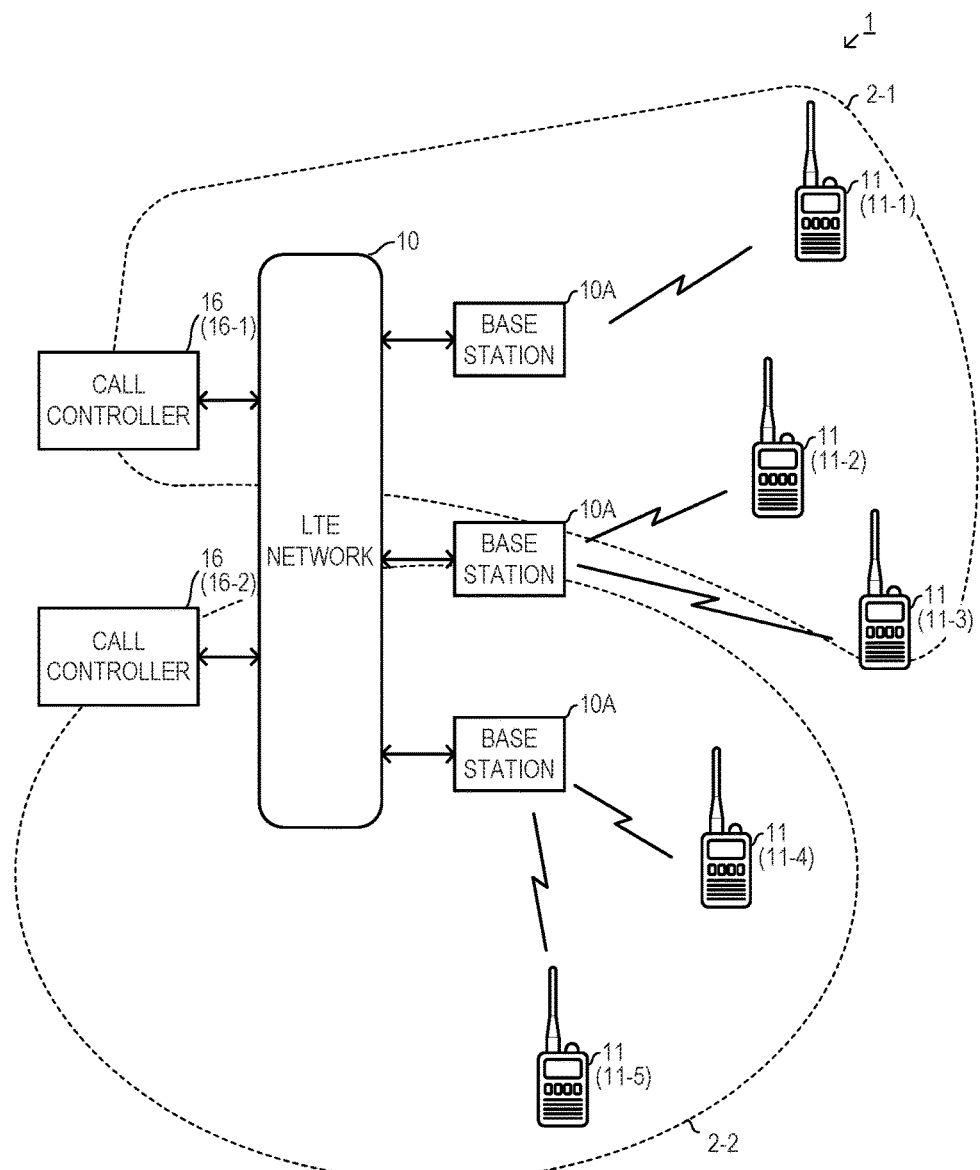
FIG. 1 is a structure diagram of a call control system of a voice communication system which is an embodiment of the present invention.
Figure 4:
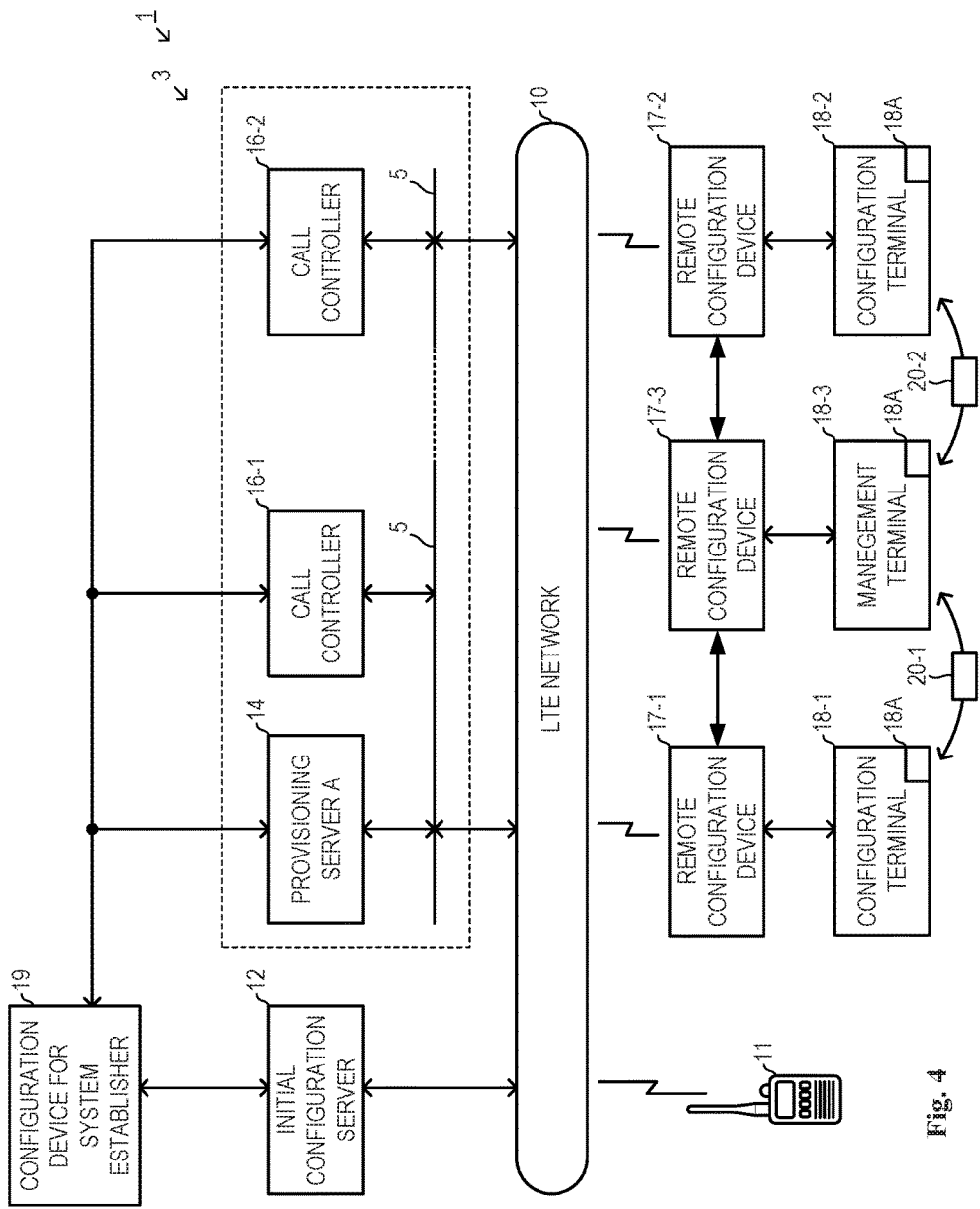
FIG. 4 is a structure diagram of a terminal configuration system of the voice communication system.

A voice communication system of the present invention will be described by referring to the attached drawings. FIG. 1 is a structure diagram of a call control system 2 of the voice communication system which is an embodiment of this invention. FIG. 4 is a structure diagram of a terminal configuration system 3 of the voice communication system. This voice communication system 1 includes two call control systems 2-1 and 2-2, and voice communications are conducted at each of the call control systems 2-1 and 2-2, respectively. The call control systems 2-1 and 2-2 can be bases geographically spaced apart each other, and can be geographically identical groups belonging to the different business sections. Each of the individual call control system 2-1s and 2-2 includes each of the call controllers 16-1 and 16-2, and respectively controls the voice communication among a plurality of the communication terminals with a call controller 16 as a hub.

In FIG. 1, in the call control system 2-1, communication terminals 11-1, 11-2, and 11-3 conduct voice communication with each other via a call controller 16-1. In the call control system 2-2, the communication terminal 11-4 and 11-5 conduct voice communication with each other via a call controller 16-2. Numbers of communication terminals 11 belonging to each of the call control systems are not limited in the present invention. An LTE network 10 which is a communication network for a mobile phone is used as a communication infrastructure between a call controller 16 and the communication terminal 11. The LTE network 10 has a base station 10A which is a wireless communication base. The communication terminal 11 accesses the LTE network 10 by communicating with the base station 10A. It should be noted that the communication infrastructure is not limited to the LTE network in the present invention.

Figure 2:
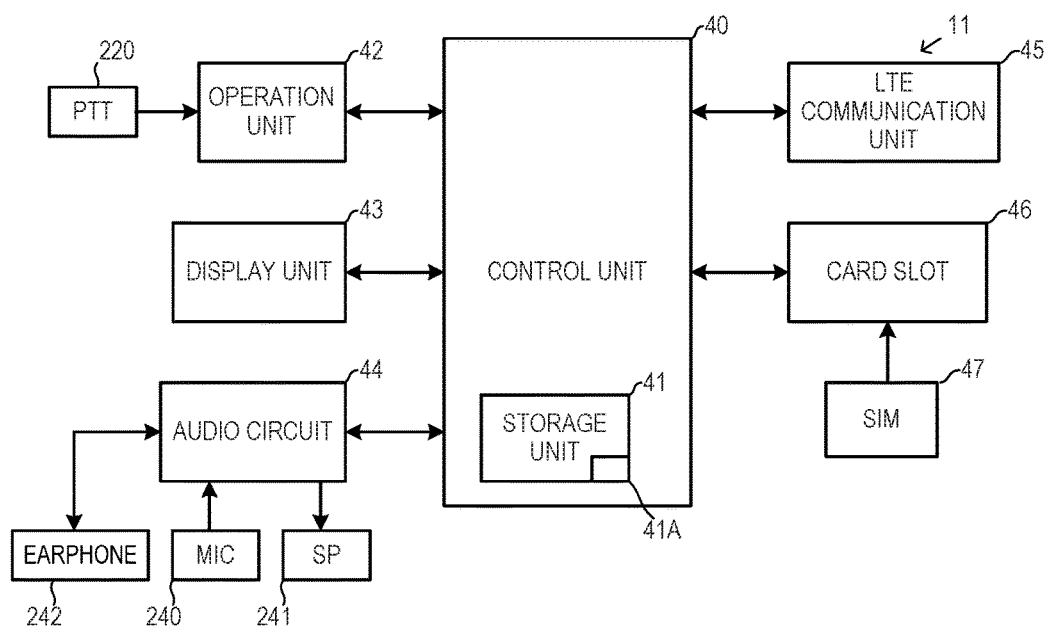
FIG. 2 is a block diagram of a communication terminal.
Figure 3:
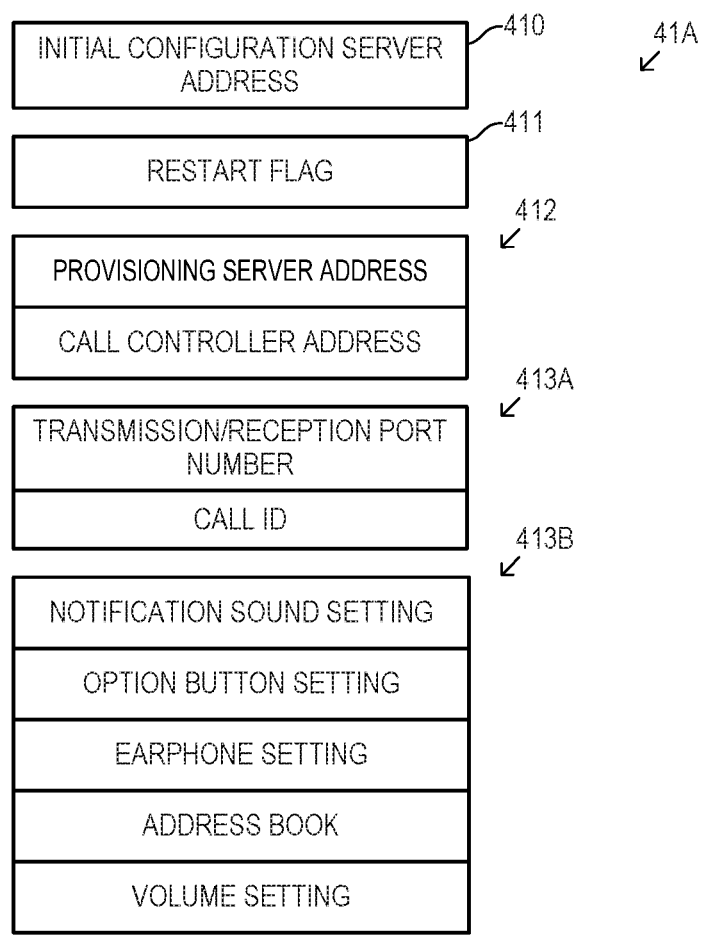
FIG. 3 is a diagram illustrating provisioning data configured in the communication terminal.

FIG. 2 is a block diagram of the communication terminal 11. The communication terminal 11 has an appearance of a handy transceiver as illustrated in FIG. 1, but functionally, it is a wireless network device which transmits/receives a voice signal via the base station 10A of the LTE network 10. A control unit 40 for controlling an operation of the device is structured by a microprocessor. The control unit 40 has a storage unit 41 in which various type of the data are stored. The storage unit 41 has a provisioning data storage area 41A. A various type of provisioning data as illustrated in FIG. 3 are stored in the provisioning data storage area 41A. An operation unit 42, a display unit 43, an audio circuit 44, and an LTE communication unit 45 are connected to the control unit 40. The operation unit 42 includes a key switch such as a PTT switch 220, and receives an operation by a user and inputs its operation signal to the control unit 40. The display unit 43 includes a liquid crystal display. The liquid crystal display displays an identification number of the communication partner selected by the user's operation or an identification number of the communication partner whose incoming call was received.

An audio circuit 44 has a microphone 240 and a speaker 241. The control unit 40 decodes the received voice signal and inputs it to the audio circuit 44. The audio circuit 44 converts the decoded audio signal to an analog signal and outputs it from the speaker 241. Moreover, the audio circuit 44 also converts the voice signal input from the microphone 240 to a digital signal, and inputs it to the control unit 40. The control unit 40 makes this digital audio signal into a voice packet and inputs it to an LTE communication unit 45. The LTE communication unit 45 has a circuit conducting wireless communication in an LTE communication mode and transmits the packet input from the control unit 40 toward the base station 10A and inputs a packets received from the base station 10A to the control unit 40. It should be noted that an earphone connector 242 is provided in the audio circuit 44. When an earphone microphone (not shown) is connected to the earphone connector 242, the microphone 240 and the speaker 241 provided in the communication terminal 11 body stop their functions, and a microphone and speaker (earphone) of the earphone microphone are enabled. An IC card (SIM card) 47 storing a terminal identification information is set in the card slot 46. The terminal identification information (ICCID) stored in the SIM card 47 is used as the identification information for each of the communication terminals 11. A module in which the terminal identification information (ICCID) is written may be incorporated instead of the SIM card 47.

When the user inputs voice toward the microphone 240 while pressing the PTT switch 220 by using the communication terminal 11 structured as above, the communication terminal 11 edits the voice signal into a voice packet and transmits it to the call controller 16 via the base station 10A.

FIG. 3 is a diagram illustrating structure of the provisioning data storage area 41A of the storage unit 41. In the provisioning data storage area 41A, the provisioning data as follows is stored. It should be noted that, an initial configuration server address of the following data is written non-volatilely at a shipment of the communication terminal 11, and is not included in the provisioning data. Moreover, a restart flag 411 illustrated in FIG. 3 is a flag set by the server during provisioning process, but is not included in the provisioning data.

Initial configuration server address: IP address of an initial configuration server 12 illustrated in FIG. 4

Provisioning server address: IP address of provisioning server 14 illustrated in FIG. 4

Call controller address: IP address of call controller 16

Transmission/reception port number: Transmission/reception port number of a provisioning server 14 when communicating with the call controller 16

Call ID: own call ID of the communication terminal 11 itself

Notification sound setting: Selection information of notification sound for an incoming call or the like Option button setting: Assignment information of functions to option buttons provided in the operation unit 42

Earphone setting: Setting information whether or not full-duplex communication is to be conducted when earphone microphone is connected Address book: call ID list of communication terminals 11 which can be called Volume setting: Volume setting information of communication sound In the abovementioned data, the provisioning server address and the call controller address are common data 412 of communication terminals 11 belonging to the same call control system. The call ID, the transmission/reception port number, the notification sound setting, the option button setting, the earphone setting, the address book, and the volume setting are the individual data 413 set individually for each of the communication terminals 11. Among them, the call ID and the transmission/reception port number are individual fixed data 413A which is unique to each of the communication terminals 11 and cannot be changed by the operation of the communication terminal 11. The notification sound setting, the option button setting, the earphone setting, the address book, and the volume setting which are the provisioning data other than above are individual variable data 413B which can be changed by the operation of the communication terminal 11 by the user. The types and the numbers of the common data 412, the individual fixed data 413A, and the individual variable data 413B are not limited to those in this embodiment in the present invention.

FIG. 4 is a diagram illustrating structure of the terminal configuration system 3 for writing the provisioning data in the communication terminal 11. An initial configuration server 12, a provisioning server 14, and the abovementioned call controller 16-1 and 16-2 are installed in the LTE network 10. The provisioning server 14, and the call controller 16-1 and 16-2 can be directly connected to the LTE network 10, and can be connected to a local area network 5 which is connected to the LTE network 10 via a gateway (not shown). The initial configuration server 12 is accessed from the communication terminal 11 and a remote configuration device 17 at startup. The provisioning server 14 sets the provisioning data of FIG. 3 to the communication terminal 11.

The communication terminal 11 conducting voice communication accesses the initial configuration server in the initial state, that is, at shipment from a factory or at initialization, and obtains an address of the provisioning server 14 in the voice communication system 1. When a plurality of voice communication systems 1 are in operation on the LTE network 10, the communication terminal 11 becomes capable of receiving the configuration corresponding to a voice communication system 1-n to which they belong by configuring an address of the provisioning server 14 in the communication terminal 11. That is, the communication terminal 11 obtains the provisioning data, which enables the communication terminal 11 to operate in the voice communication system 1-n to which they belong, from the provisioning server 14. The provisioning server 14 transmits the provisioning data to the communication terminal 11. The communication terminal 11 which has obtained the provisioning data registers the provisioning data in the provisioning data storage area 41A, accesses the call controller 16-1 (or 16-2), and requests the registration (registration of information that the communication terminal 11 is in operation). The communication terminal 11 become capable of communicating with the other communication terminal 11 as a device belonging to the call control system 2-1 or 2-2 illustrated in FIG. 1 by making the call controller 16-1 or 16-2 registered.

Figure 9A:
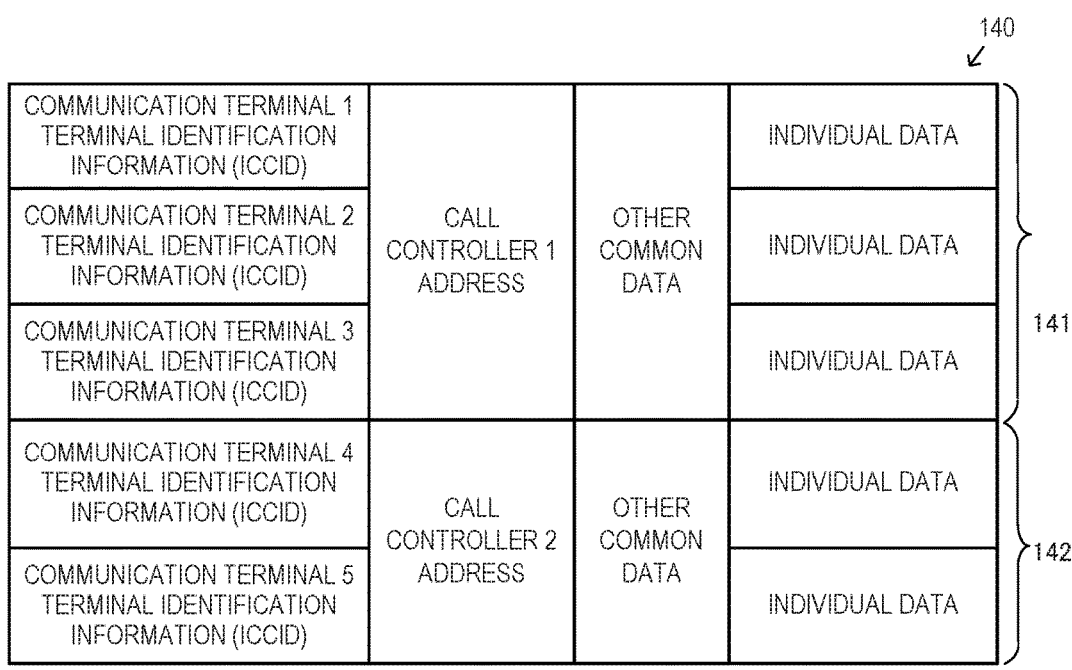
FIG. 9A is a diagram illustrating a provisioning data table provided in a provisioning server.
Figure 9B:
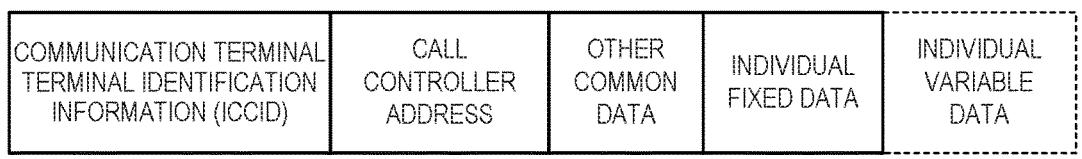
FIG. 9B is a diagram illustrating a provisioning data table provided in the provisioning server.

A table illustrated in FIG. 7A is stored in the initial configuration server 12. A provisioning table 140 illustrated in FIG. 9A is stored in the provisioning server 14. These registration table illustrated in FIG. 10A is stored in the call controller 16-1 and 16-2. These tables are provided in each server by a configuration device for the system provider 19, that is, by the system provider. The contents of the tables are written by the configuration device for the system provider 19 or a remote configuration device 17.

Figure 5:
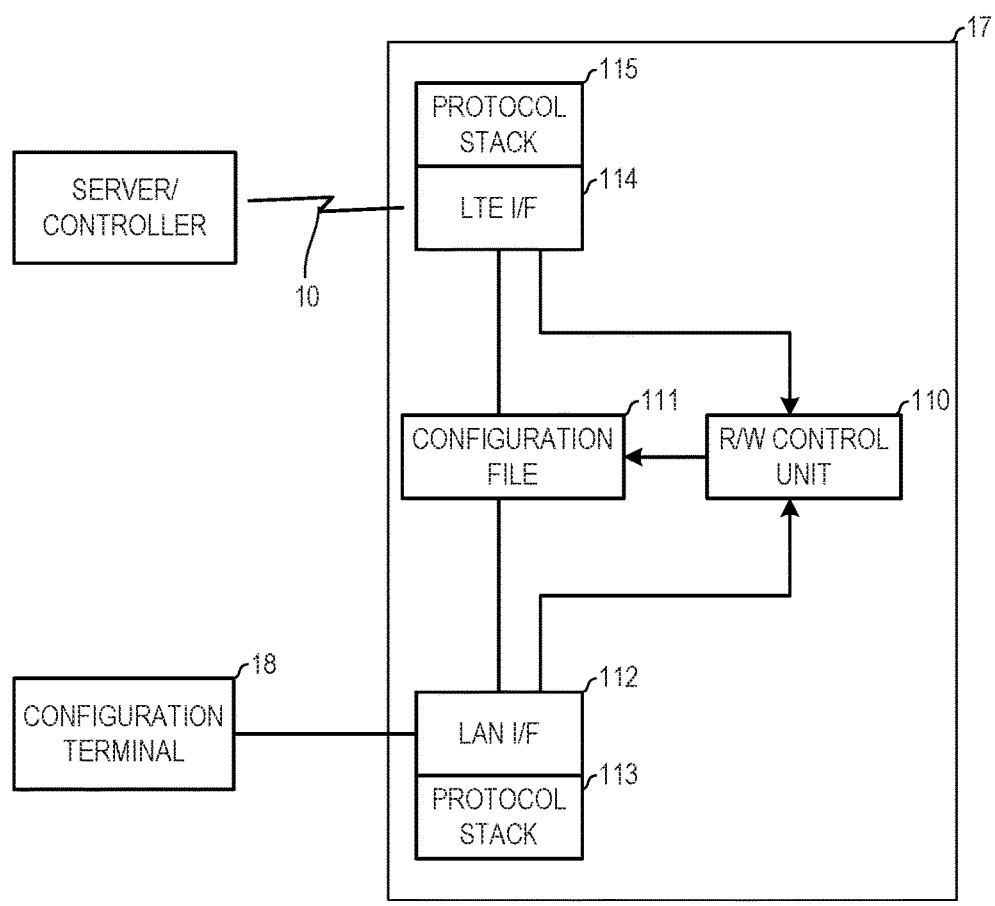
FIG. 5 is a block diagram of a remote configuration device.

A client (a system user such as a business enterprise using the voice communication system by having users (employees) holding a plurality of the communication terminals 11) can update the data in the provisioning serer 14 and the call controller 16 by using the remote configuration device 17, and change the provisioning data configured in the communication terminal, that is, the configuration of the communication terminal 11. The system administrator of the client inputs the update data to the remote configuration device by using a configuration terminal 18. The remote configuration device 17 updates the data by transmitting this data to the specified server and controller. The remote configuration device 17 is structured as illustrated in FIG. 5, and the configuration terminal 18 is structured by a personal computer, for example.

The configuration terminal 18 structured by a personal computer is provided with a media interface 18A for reading/writing a storage medium 20. The storage medium 20 can be an optical disk such as CD, and a semiconductor memory such as SD card or USB memory or the like. The storage medium 20 is used for exchanging a management information for the communication terminal 11 as described later.

The remote configuration device 17-1 and 17-2 are provided correspondingly to each of the call control systems 2-1 and 2-2. Each of the remote configuration devices 17-1 and 17-2 is operated by the configuration terminal 18-1 and 18-2. Out of the communication terminal 11 (11-1, 11-2, 11-3, 11-4, and 11-5) belonging to the voice communication system 1, the provisioning data of the communication terminal 11 (11-1, 11-2, and 11-3) belonging to the call control system 2-1 is newly input and updated by the remote configuration device 17-1. The data newly input and updated is obtained and stored by the provisioning server 14. The provisioning data of the communication terminal 11 (11-4 and 11-5) belonging to the call control system 2-2 is newly input and updated by the remote configuration device 17-2. The newly input and updated data is obtained and stored by the provisioning server 14.

The communication terminal 11 may transfer between the call control system 2-1 and 2-2. More specifically, that is the case when the user who possesses the communication terminal 11 moves among the bases, and when the belonging section has been transferred, and the like. In this instance, a management information of the communication terminal 11 is passed from/to the remote configuration device 17-1 and to/from the remote configuration device 17-2. This passing of the management information is conducted via the remote configuration device for management 17-3. In general, the remote configuration device for management 17-3 is operated by the system administrator in the client, and the remote configuration device for configuration 17-1 and 17-2 are operated by the person in charge of the configuration in the client.

FIG. 5 is a block diagram of the remote configuration device 17. The remote configuration device 17 connects the configuration terminal 18 to the server and a controller on the LTE network. The remote configuration device 17 has a LAN interface 112 communicating with the configuration terminal 18, an LTE interface 114 communicating with each server over the LTE network 10, an R/W control unit 110, and a configuration file storage unit 111.

The Lan interface 112 has a protocol stack 113 for communicating with the configuration terminal 18. This protocol stack 113 may be those for executing a protocol compliant to a general LAN standard. The LTE interface 114 has a protocol stack 115 for communicating with each server over the LET network 10. This protocol stack 115 is compliant to a standard of the LTE network 10. The configuration file storage unit 111 stores the configuration file for updating a provisioning data table in the provisioning server 14. The R/W control unit 110 controls for read/write to the configuration file storage unit 111.

In the provisioning server 14, the provisioning data table 140 illustrated in FIG. 9A is stored. The remote configuration device 17 stores a part of the provisioning data table 140, which is related to the communication terminal 11 configured by the remote configuration device 17, as a configuration file. That is, the remote configuration device 17-1 stores a part of the provisioning data table 140 related to the communication terminal 11 which is registered in the call controller 1 (16-1) as a configuration file 141. The remote configuration device 17-2 stores a part of the provisioning data table 140 related to the communication terminal 11 which is registered in the call controller 2 (16-2) as a configuration file 142. In the remote configuration device for management 17-3, the terminal management table illustrated in FIG. 8 is stored in the storage unit 111 instead of the configuration file.

As described above, the LAN interface 112 and the LTE interface 114 share the configuration file storage unit 111, but they are structured not to relay communication, and the configuration terminal 18 cannot directly transmit a command into the LTE network 10. On the other hand, since it is structured that the configuration terminal 18 is invisible from the LTE network 10 side, the configuration terminal 18 is not accessed from the LTE network 10.

FIG. 6 is a block diagram of the initial configuration server 12 and the provisioning server 14. The server has a control unit 30, a storage unit 31, and a network communication unit 32. The storage unit 31 is structured by a hard disk and a RAM, for example, and stores various tables illustrated in FIG. 7A, FIG. 7B, FIG. 9A, and FIG. 9B. The network communication unit 32 communicates with the communication terminal 11 and the remote configuration device 17 over the LTE network 10. The control unit 30 obtains the provisioning data from the remote configuration device 17 by the communication over the LTE network 10 and stores it in the storage unit 31. The control unit 30 also transmits the provisioning data stored in the storage unit 31 to the communication terminal 11 which made an access over the LTE network 10.

FIG. 7A and FIG. 7B are diagrams illustrating an initial configuration table provided in an initial configuration server 12. FIG. 7A is an initial configuration table for the remote configuration device 17. The initial configuration table for the remote configuration device 17 provides an address of the provisioning server 14 and the call controller 16-1 or 16-2 for the remote configuration device for configuration 17-1 and 17-2. The initial configuration table for the remote configuration device 17 provides a list of the communication terminal 11 belonging to the voice communication system 1 for the remote configuration device for management 17-3. In this table, addresses of the provisioning server 14 and the call controller 16-1 or 16-2 are stored correspondingly to an identification information for each of the remote configuration devices 17-1 and 17-2. The identification information of the communication terminal 11 belonging to the voice communication system 1 is stored correspondingly to an identification information for each of the remote configuration devices 17-3. As the identification information of the remote configuration device 17 and the communication terminal 11, an ICCID which is an ID for communication on the LTE network 10 may be used.

At each power on, the remote configuration device 17 accesses the initial configuration server 12 and obtains the server address and a list of the communication terminal, whereby an operation becomes possible.

FIG. 7B is an initial configuration table of the communication terminal 11. This table stores addresses of the provisioning server 14 associated with all the communication terminals 11. The initial configuration server 12 is used for initial configuration for a plurality of the communication systems 1, and an address for the provisioning server 14 of the voice communication system 1 is stored in each of the initial configuration tables for the voice communication system.

When the communication terminal 11 is powered on in the initial state, the communication terminal 11 accesses the initial configuration server 12 to obtain the address of the provisioning server 14. Then, the communication terminal 11 is restarted and accesses the provisioning server 14 to obtain the provisioning data. The communication terminal 11 which has once obtained (configured) the provisioning data directly accesses the provisioning server 14 at subsequent power on without accessing the initial configuration serer 12.

The initial configuration table of the initial configuration server 12 illustrated in FIG. 7A is updated by the system provider using the configuration device for the system provider 19. When the system provider installs the voice communication system 1 (provisioning server 14, call controller 16-1 and 16-2) for the client and delivers the communication terminal 11 and the remote configuration device 17 which are used in this voice communication system 1, configuring the initial configuration table to the communication terminal 11 and the remote configuration device 17, the communication terminal 11 and the remote configuration device 17 are made as devices for using in the voice communication system 1.

FIG. 8 is a diagram illustrating a terminal management table provided in the remote configuration device for management 17-3. In the terminal management table, belonging information indicating whether the communication terminal 11 belongs to the call control system 2-1 or 2-2 association with the identification information of each of the communication terminals 11. Herein, information of a base 1 is stored as the belonging information of the communication terminal 11 belonging to the call control system 2-1, and information of a base 2 is stored as the belonging information of the communication terminal 11 belonging to the call control system 2-2. Information of a non-belonging is stored as the belonging information of the communication terminal 11 which belongs to neither of the call control system.

In this voice communication system 1, the communication terminal 11 is taken over from the system provider to the client without belonging to either of the call control system 2-1 or 2-2. The remote configuration device for management 17-3 makes the communication terminal 11 belong to the call control system. 2-1 or 2-2 by delivering the management information to the remote configuration device 17-1 or 17-2. A belonging information in the terminal management table is rewritten correspondingly to processing of the delivery.

FIG. 9A is a diagram illustrating an example of the provisioning data table 140 provided in the storage unit 31 in the provisioning server 14. In the provisioning data table, correspondingly to each of the communication terminals 11, provisioning data is stored which is necessary to configure the corresponding communication terminal 11. The provisioning data is, as described above, constituted of the common data 412 and the individual data 413. The common data 412 includes an address of the call controller 16-1 or 16-2 of the call control system 2-1 or 2-2 to which the communication terminal belongs. As described above, the configuration files 141 and 142 which are a part of this provisioning table 140 are stored in the remote configuration device 17-1 and 17-2 respectively. When the contents of the configuration files are updated by the remote configuration device 17, the updated configuration file is obtained (downloaded) by the provisioning server 14 and the provisioning data table is also updated (synchronized).

It should be noted that all the individual data are stored in the provisioning data table in illustrated FIG. 9A, but in the provisioning, not all of the individual data need to be set to the communication terminal 11. For example, it is permissible to set all the individual data to the communication terminal 11 which is in initial state, and to set an individual fixed data 413A among the common data 412 and the individual data 413 of the communication terminal 11 and not to set an individual variable data 413B to the configured communication terminal 11. That is, as the configured communication terminal 11 can be rewritten the individual variable data 413B depending on a user, it may be better not to be rewritten the individual variable data 413B updated by the user.

FIGS. 10A and 10B are diagrams illustrating the registration tables of the call controller 16-1 and 16-2. FIG. 10A shows the registration table of the call controller 16-1. FIG. 10B shows the registration table of the call controller 16-2. In each of the registration tables, a list of the communication terminals belonging to the call controller 2-1 and 2-2 respectively, and an active flag for each of the communication terminals 11 are stored. When the communication terminal 11 accesses the call controller 16 and requests registration, the call controller 16 sets an active flag corresponding to the communication terminal 11 and stores the state that the communication terminal 11 is under the operation. As a result, the call controller 16 permits itself to transmit/receive the voice signal to/from the communication terminal 11. It is noted that the remote configuration device 17-1 stores the configuration file which has the same contents as the registration table illustrated in FIG. 10A, and the remote configuration device 17-2 stores the configuration file which has same contents as the registration table illustrated in FIG. 10B.

The installation of a frame of the table and preset of the data illustrated in FIG. 9 and FIG. 10 are conducted by the system provider. Each of the data is capable to be set and changed by the client by using the remote configuration device 17. Moreover, the individual variable data 413B can be changed within a storage unit 41A in the communication terminal 11 by the user by operating the communication terminal 11.

FIG. 11 is a flow chart illustrating the operation in activation of the remote configuration device 17-1 and the remote configuration device 17-2. The remote configuration devices 17-1 and 17-2 executes the operation individually. Hereinafter, the operation of the remote configuration device 17-1 is described as representative of both of the remote configuration devices. When the power is on, the remote configuration device 17-1 accesses the initial configuration server 12 (S10). The initial configuration server 12 reads out the identification information of the accessed remote configuration device 17-1, refers an initial configuration table with the identification information, and replies an address of the call controller 16-1 of the call control system 2-1 to which the remote configuration device 17 belongs. Consequently, the remote configuration device 17 obtains addresses of the provisioning server 14 and the call controller 16-1 (S11). Then, the operations to access the provisioning server 14 and the call controller 16-1 and to update data are enabled by the operation from the configuration terminal 19.

Figure 12:
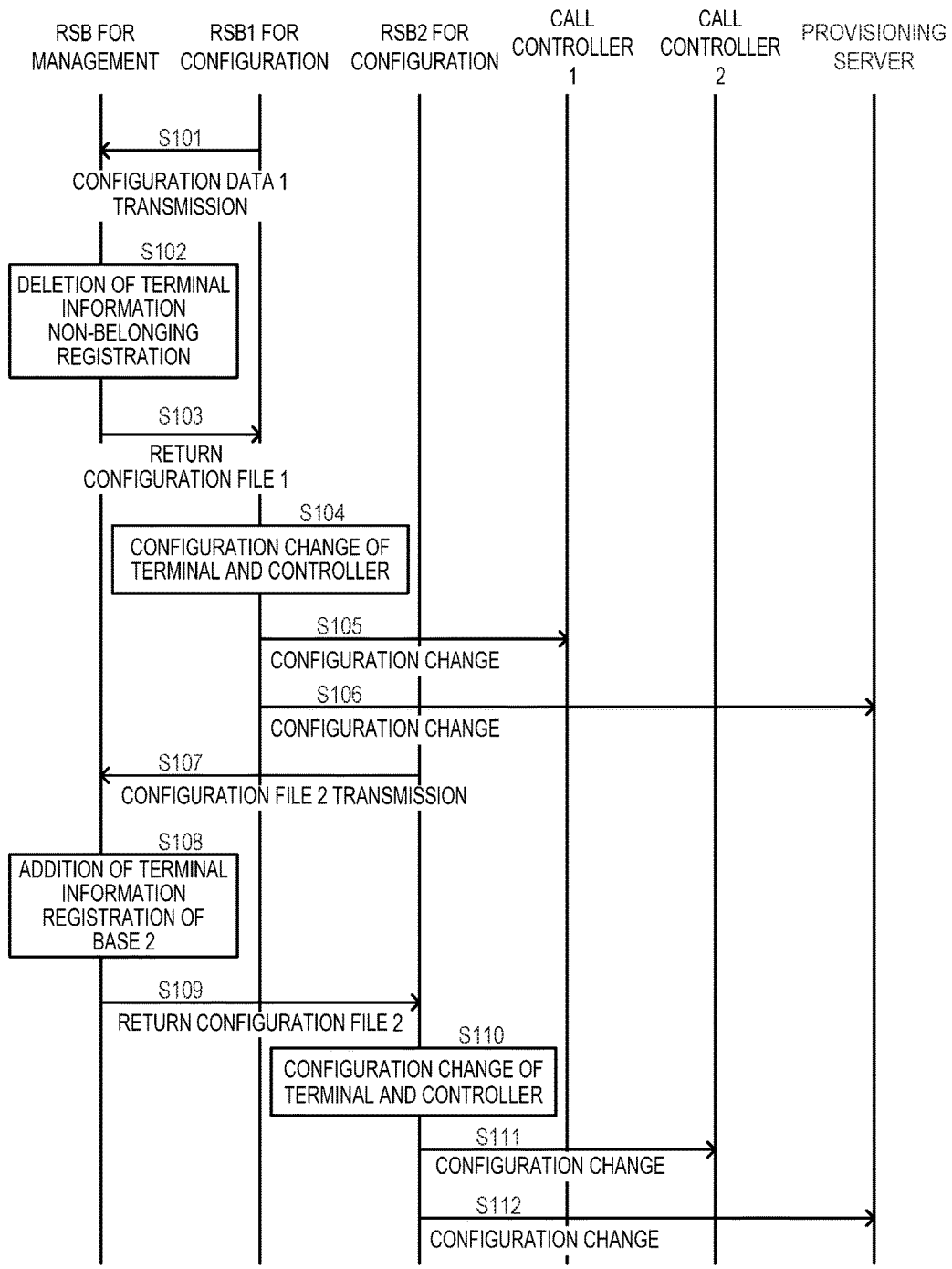
FIG. 12 is a diagram illustrating step for moving a belonging of the terminal device among call control systems.

FIG. 12 is a diagram illustrating step to change belonging of the communication terminal 11. Here, it is described that the communication terminal 11-3 is transferred from the call control system 2-1 to the call control system 2-2, for example.

At first, the configuration file 141 is transmitted from the remote configuration device 17-1 (RSB 1 for configuration) for setting the data of the call control system 2-1 to the remote configuration device for management 17-3 (RSB for management). This is executed by following step, for example. A person in charge of configuration for the call control system 2-1 reads out the configuration file 141 from the remote configuration device 17-1 by operating a configuration terminal 18-1 and copies it to a storage media 20-1. This storage media 20-1 is delivered to the system administrator. The system administrator sets up this storage media 20-1 in the management terminal, and reads the configuration file 141.

The update to delete an information of the communication terminal 11-3 from the configuration file 141 is conducted by the operation of the management terminal 18-3 by the system administrator, and belonging information of the communication terminal 3 (11-3) in the terminal management table of the remote configuration device for management 17-3 is rewritten to non-belonging (S102). Then, the individual data related to user configuration of the communication terminal 11-3 may be stored in the remote configuration device for management 17-3.

The configuration file 141 is returned from the remote configuration device for management 17-3 to the remote configuration device for configuration 17-1 (S103). This is executed by following step, for example. The system administrator returns the storage medium. 20-1 which stores the updated configuration file 141 to the person in charge of the configuration of the call control system 2-1. The person in charge of the configuration sets the storage medium. 20-1 to the configuration terminal 18-1, and then writes the updated configuration file 141 into the remote configuration device 17-1.

The person in charge of configuration of the call control system 2-1 changes the configuration that the configuration file of the registration table of the call controller 16-1 and the like is to be rewritten based on the updated content for the configuration file 141 (S104). Then, the call controller 1 (16-1) and the provisioning server 14 obtain (download) the changed configuration file (S105, S106). By abovementioned procedure, the communication terminal 11-3 is deleted from the call control system 2-1, and becomes to be non-belonging.

Then, to make the communication terminal 11-3 which became to be non-belonging belong to the call control system 2-2, the configuration file 142 is sent from the remote configuration device 17-2 (RSB2 for configuration) for setting the data of the call control system 2-2 to the remote configuration device for management 17-3 (S107). This is executed by following step, for example. The person in charge of the configuration of the call control system 2-2 operates the configuration terminal 18-2, reads out the configuration file 142 from the remote configuration device 17-2, and copies it to the storage media 20-2. The storage media 20-2 is delivered to the system administrator. The system administrator sets up this storage media 20-2 to the management terminal 18-3, and the configuration file 142 is read.

An update for adding an information of the communication terminal 11-3 for the configuration file 142 is conducted by the operation of the management terminal 18-3 by the system administrator, and the belonging information of the communication terminal 3 (11-3) in the terminal management table of the remote configuration device for management 17-3 is rewritten to a base 2 (S108). The individual data related to user setting of the communication terminal 11-3 may be transcribed at this time. In the remote configuration device for management 17-3 (management terminal 18-3), a process for adding the communication terminal 3 (11-3) to the configuration file is allowed only for the communication terminal 3 (11-3) of which the belonging information is non-belonging.

The configuration file 142 is returned from the remote configuration device for management 17-3 to the remote configuration device for configuration 17-2 (S109). This is executed by following step, for example. The system administrator returns the storage media 20-2 stored the updated configuration file 142 to the person in charge of configuration of the call control system 2-2. The person in charge of the configuration sets up the storage media 20-2 to the configuration terminal 18-2, and the updated configuration file 142 is written in the remote configuration device 17-2.

The person in charge of the configuration of the call control system 2-2 changes the configuration that the configuration file of the registration table of the call controller 16-2 and the like is to be rewritten based on the updated content for the configuration file 142 (S110). Then, the call controller 2 (16-2) and the provisioning server 14 obtain (download) the changed configuration file (S111. S112). By the abovementioned procedure, the communication terminal 11-3 becomes to belong to the call control system 2-2.

It should be noted that the operation and the return of the configuration file may be conducted by a method other than the delivery of the storage media 20. It may be forwarded via online such as e-mail.

In the abovementioned example, the process for adding the communication terminal 11 to the configuration file is allowed only for the communication terminal 11-3 having configured to be non-belonging as the belonging information, but addition and deletion may be conducted depending on the memory and decision of the system administrator. That is, the remote configuration device for management 17-3 may not have a terminal management table.

Figure 13:
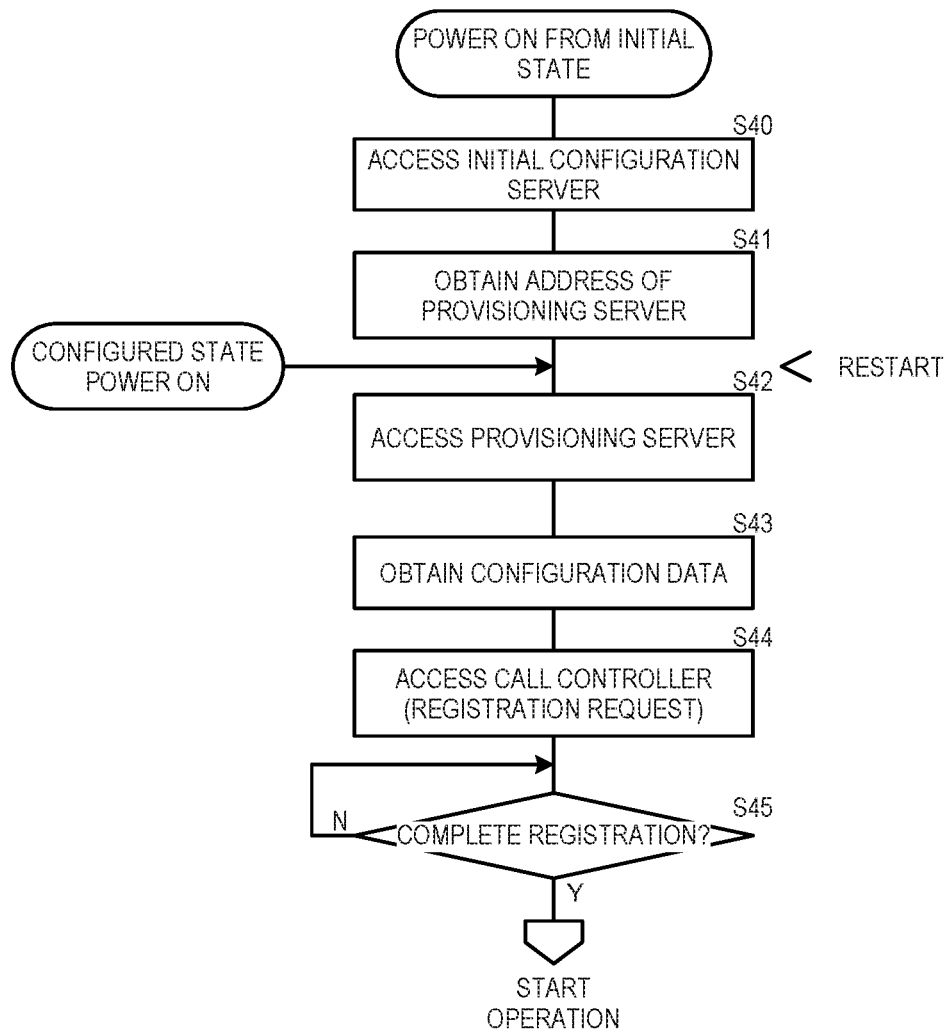
FIG. 13 is a diagram describing a step for setting a data for the communication terminal.

FIG. 13 is a diagram for illustrating steps of the configuration of the communication terminal 11 from the initial state. When power is on, the communication terminal 11 accesses the initial configuration server 12 (S40), obtains the address of the provisioning server 14 (S41). And after restarted, the communication terminal device 11 accesses the provisioning server 14 (S42), and obtains the provisioning data from the provisioning server 14 (S43). Then, the communication terminal 11 accesses the call controller 16 by using the address included in the provisioning data, and requests registration (S44). When the notification of the registration completion from the call controller 16 is received (YES in S45), the communication terminal device 11 becomes capable of the operation.

The communication terminal 11 which is once powered off or the communication terminal 11 restarted starts the operation from S42, and accesses the provisioning server 14. Here, the common data 412 and the individual fixed data 413A are reconfigured. As a result, even when the provisioning data has been changed by the remote configuration device 17 before the power is on, the change can be reflected in the configuration of the communication terminal 11. In this case, the individual variable data 413B is not also rewritten as the user may change the configuration of the communication terminal 11, respectively.

In this embodiment, the voice communication system 1 using the LTE network 10 was described, but the network for use is not limited to the LTE network 10.

The call control system 2-1 associates with a first communication system according to the present invention, and the call control system 2-2 associates with a second communication system according to the present invention. The remote configuration device 17-1 associates with a first configuration device according to the present invention, the remote configuration device 17-2 associates with the second configuration device according to the present invention and the remote configuration device 17-3 associates with a management device (communication system management device) according to the present invention.

In this embodiment, an example that the communication terminal 11 is moved between the call control system 2-1 (remote configuration device 17-1) and the call control system 2-2 (remote configuration device 17-2) via the remote configuration device 17-3 is described, but the call control system 1-$n$ is not limited to 2. Even if n is 3 or more, the communication terminal 11 can move among the respective call control system 1-$n$ via the remote configuration device 17-3.

In FIG. 1 and FIG. 4, the provisioning server 14, the call controller 16-1 and 16-2 are described to have separate hardware respectively, but they may share the hardware.

That is, the whole or a part of each server may be a virtual server, and in that case the service may be such that each of them operates on the same hardware.

REFERENCE NUMERALS 1. voice communication system
2-1, 2-2 call control system
10 LTE network
11(11-1 to 11-5) communication terminal
12 initial configuration server
14 provisioning server
16(16-1, 16-2) call controller
140 provisioning data table
141, 142 configuration file

What is claimed is:

1. A communication system management method to transfer a predetermined communication terminal belonging to a first communication sub-system to a second communication sub-system in a communication system, wherein:
  the communication system includes:
    the first communication sub-system and the second communication sub-system, wherein each communication terminal belonging to one of the first communication sub-system and the second communication sub-system does not communicate with communication terminals belong to an other one of the first communication sub-system and the second communication sub-system;
    a first server that controls a communication between communication terminals belonging to the first communication sub-system;
    a second server that controls a communication between communication terminals belonging to the second communication sub-system;
    a first configuration device that includes a first configuration file storing therein configuration data of the communication terminals belonging to the first communication sub-system and that configures the first server with information of the communication terminals belong to the first communication sub-system;
    a second configuration device that includes a second configuration file storing therein configuration data of the communication terminals belonging to the second communication sub-system and that configures the second server with information of the communication terminals belong to the second communication sub-system; and
    a management device that updates the first configuration file and the second configuration file,
  the method is comprising:
    causing the management device to acquire the first configuration file from the first configuration device;
    deleting information of the predetermined communication terminal from the first configuration file;
    causing the first configuration device to read in the first configuration file;
    causing the management device to acquire the second configuration file from the second configuration device;
    adding the information of the predetermined communication terminal to the second configuration device;
    causing the second configuration device to read in the second configuration file;
    causing the first configuration device to update the information configured to the first server with the read first configuration file; and
    causing the second configuration device to update the information configured to the second server with the read second configuration file.

2. The communication system management method according to claim 1, wherein
  the management device comprises a terminal management table storing belonging of all the communication terminals belonging to the first communication sub-system and the second communication sub-system,
  the method further comprising:
    when deleting the configuration data of the predetermined communication terminal from the first configuration file, rewriting the belonging of the predetermined communication terminal in the terminal management table into a content indicating non-belonging, and,
    when adding the configuration data of the predetermined communication terminal to the second configuration file, rewriting the belonging of the predetermined communication terminal in the terminal management table into a content indicating the second communication sub-system.

3. The communication system management method according to claim 2, wherein
  the management device executes the step of adding the configuration data of the predetermined communication terminal to the second configuration file only when the belonging of the predetermined communication terminal in the terminal management table has the content indicating non-belonging.

* * * * *